J. LEE.
Corn-Planter.
No 28,383. Patented May 22, 1860.
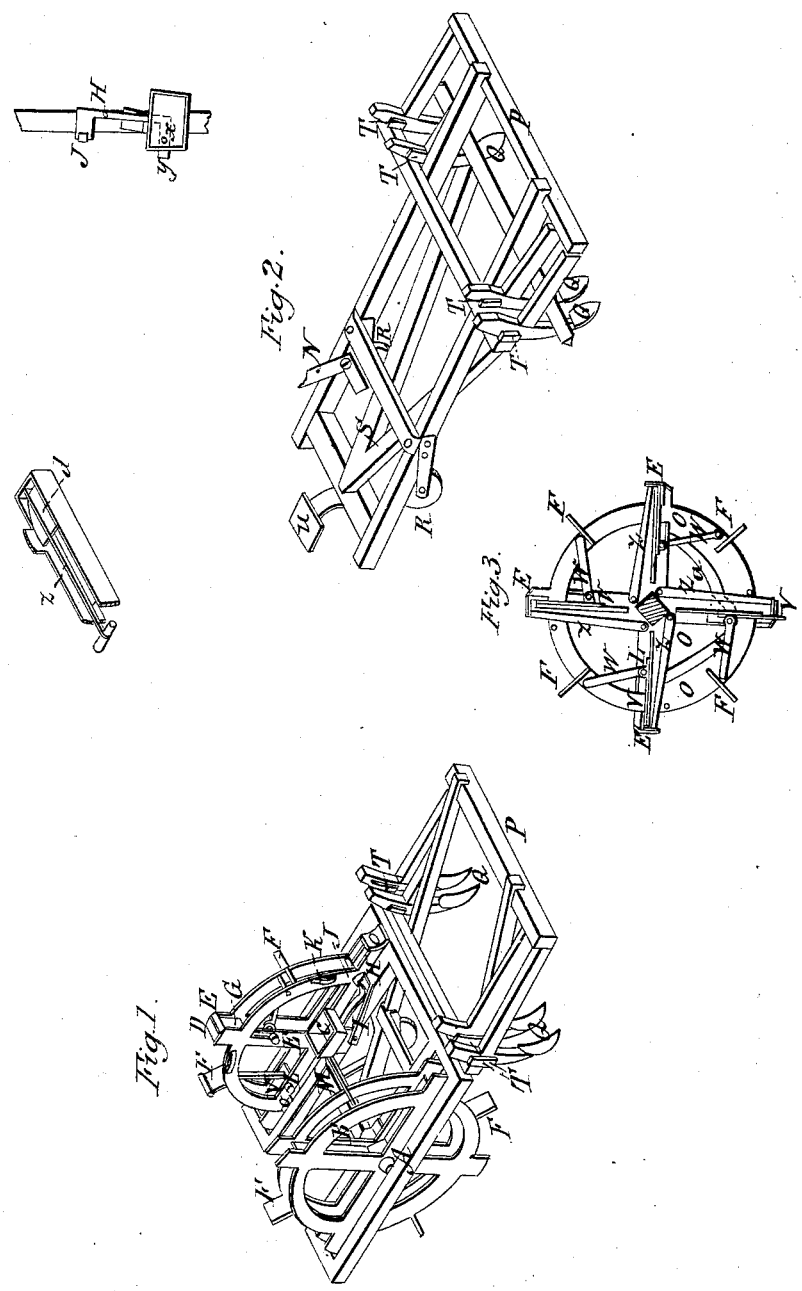

UNITED STATES PATENT OFFICE.

JOEL LEE, OF GALESBURG, ILLINOIS.

IMPROVEMENT IN CORN-PLANTERS.

Specification forming part of Letters Patent No. 28,383, dated May 22, 1860.

*To all whom it may concern:*

Be it known that I, JOEL LEE, of Galesburg, in the county of Knox and State of Illinois, have invented a new and useful Improvement in Seed-Planters; and I do hereby declare that the following is a full, clear, and exact description of the same, reference being had to the annexed drawings, making a part of this specification, in which—

Figure 1 is a perspective view. Fig. 2 is a perspective view of truck and plows. Fig. 3 is a perspective view of plunger, oscillating arm, and cam-rollers; Fig. 4, oscillating arm and cut-off valve; Fig. 5, view of friction-roller, dropper, and lever; Fig. 6, side view of planting-wheel.

My invention relates to improvements in several parts of the seed-planters now in use, and is designed to render such planters more accurate.

The first part of my invention consists in furnishing the seeding-wheels with feet to step the ground and mark the place where the hill is, said feet being formed nearly flat and without projections, so as to be capable of being scraped at every revolution, thereby keeping them of the same uniform length; second, in providing the feet with plungers, with friction-rollers attached, said rollers running in a cam which presses the plungers into the earth, the plunger retained in its place by an oscillating arm, thereby avoiding friction; third, in making a groove in the top of the dropper leading back from the seed-chamber to prevent cutting seed; fourth, in forming a seed-chamber within the foot sufficiently deep to hold the seed, the sides perpendicular when the foot is down, and just large enough to permit the plunger to pass through, thereby insuring the seed to be all thrust out; fifth, in furnishing a cut off valve attached to a heavy oscillating arm, and hung in such a manner as to close the valve by its own weight as the wheel revolves; sixth, in hanging the planter-frame to the truck-frame by an eye in the center, thereby permitting the planter to accommodate itself to the inequalities of the ground independent of the trucks; seventh, in furnishing a set of plows to throw the dirt into ridges to plant in, thereby insuring fresh soil to deposit the seed in, and also raising it above water in a wet time.

To enable others skilled in the art to make and use my invention, I will proceed to describe its construction and operation.

A represents the frame for the planter; B B, seeding-wheels; C, seed-box; D, end of foot in seeding-wheel; E E E, seed-chamber in foot; F F F F, false foot; G, section of seed-chamber; H, dropper; I, spring; J, friction-roller to dropper; K K, cam; L L L L, friction cam-rollers; M, shaft; N, rest for planter when raised; O O, cam for friction-rollers on plunger; P, truck-frame; S, lever for raising plows; T T T T, grooves for plows; U, driver's seat; V V, plunger; W, oscillating arm attached to plunger; X, groove in dropper; Y, seed-chamber in dropper; Z, cut-off valve; *a*, extension of cam; Z *d*, cut-off valve when opened and closed; *e*, scraper. The seed-hopper is forward of the center of the seeding-wheel. As the wheel revolves the cam on the inside of the wheel presses the roller back, which shoves the dropper out and drops the seed into the cam of the wheel. As it is descending the seed rolls down past the plunger into the seed-chamber against the cut-off valve, which is now closed. As the wheel revolves the cam presses the friction-rollers and plunger down, opening the valve, and thrusting the seed out of the bottom of the foot into the ridge already made by the plows. As the hills are distinctly marked, the operator can see when the planter is out of check. By raising the rear end of the planter and placing it on the rest it can be easily turned to correspond with the hills already planted. If the plows become clogged, place the foot on the lever S, pressing it down, and raising the plows entirely out of the ground.

What I claim as my invention, and desire to secure by Letters Patent, is—

1. The feet formed and constructed as described, the plunger, the friction-rollers, the cam, and the oscillating arm to save friction of the plunger, when the same are arranged and used in the manner and for the purpose specified.

2. The arrangement of the seed-chamber in the foot with the cut-off valve, the oscillating arm, and the groove in the top of the dropper, when used as and for the purpose specified.

JOEL LEE.

In presence of—
WM. M. WOOLLEY,
J. C. SCROGGS.